United States Patent [19]

Wu

[11] Patent Number: 4,669,746
[45] Date of Patent: Jun. 2, 1987

[54] RESILIENT BICYCLE

[76] Inventor: Jia-Shyang Wu, 259, Kung-An Road, Mei-Shan Villabe, Huo-Li District, Taichung Hsien, Taiwan

[21] Appl. No.: 802,177

[22] Filed: Nov. 26, 1985

[51] Int. Cl.⁴ .............................................. B62M 1/04
[52] U.S. Cl. ..................................... 280/221; 280/229
[58] Field of Search ............... 280/1.175, 1.183, 1.191, 280/11, 12.1, 12.13, 12.14, 200, 210, 212, 218, 220, 221, 226 R, 229, 275, 283

[56] References Cited

U.S. PATENT DOCUMENTS

| | | | |
|---|---|---|---|
| 1,664,864 | 4/1928 | Rutherford | 280/229 |
| 1,679,819 | 8/1928 | Fageol | 280/229 |
| 3,336,046 | 8/1967 | Seiling | 280/229 |
| 3,647,241 | 3/1972 | Huyssen | 280/229 X |
| 4,201,396 | 5/1980 | Gessi | 280/229 |

FOREIGN PATENT DOCUMENTS 457694 12/1936 United Kingdom ................ 280/229

Primary Examiner—John J. Love
Assistant Examiner—Charles R. Watts
Attorney, Agent, or Firm—Christie, Parker & Hale

[57] ABSTRACT

A resilient bicycle having a front wheel, a rear wheel, and a frame structure, including a head tube with a down strut. A level extension stem is provided at an end of the down strut and a tread board is fixed on top of the level extension stem for being treadled by a user standing on it. A rear fork member with an inclined connection plate at each end is connected to the rearward end of the extension stem. A hub fitting is eccentrically arranged in the rear wheel through a plurality of different length spokes and a transmission mechanism is elastically connected between the hub fitting and the rear fork member for converting the vibrating motion created by treadling into a rotational motion for driving the rear wheel. By repeatedly causing the tread board to be pushed down and rebound, the bicycle smoothly moves forward.

1 Claim, 7 Drawing Figures

RESILIENT BICYCLE

BACKGROUND OF THE INVENTION

This invention relates to a new bicycle, and more particularly to a resilient bicycle in which a tread board and a transmission mechanism are arranged to vibrate for generating the kinetic energy required to drive the bicycle.

Owing to the advancements made in transportation, bicycles, which were once an important means of travel, have been replaced by motor cars and other vehicles. At present, bicycles are used usually as sports and recreational equipment. In spite of the achievements made in motor vehicles, the driving principle of conventional bicycles has remained unchanged. The driving structure usually includes a chain and chain wheel which is propelled by the feet of a rider sitting on a saddle-like seat. From an athletics standpoint, the transmission structure of conventional bicycles is not desireable because only the legs of the rider recieve exercise. In addition, because the traditional transmission system of bicycles is a combination of cranks, chain and chain wheel, the manufacturing cost are high and maintenance operations are difficult.

SUMMARY OF THE INVENTION

It is accordingly a primary object of this invention to provide a resilient bicycle with a new type of transmission mechanism for promoting the efficiency and increasing the appeal of bicycle-riding exercise.

Is is another object of this invention to provide a resilient bicycle with a unique configuration in the riding structure to incite the curiosity of consumers and increase consumers' demand for the bicycle.

It is a further object of this invention to provide a resilient bicycle without chain, cranks, and chain wheel to minimize manufacturing costs and to facilitate maintenance operations.

These and other objects are achieved by providing a resilient bicycle which comprises a frame structure with a front wheel and a rear wheel rotatably connected to the frame structure. A tread board is provided on a level member of the frame structure which is treadled thereon by the rider. A hub fitting is arranged eccentrically in the rear wheel by means of a plurality of spokes of differing lengths and a transmission mechanism is installed between the hub system of the rear wheel and the rear end of the tread board which converts the vibrating motion of the tread board into rotational motion of the rear wheel for driving the bicycle. By repeatedly causing the tread board to vibrate, i.e. to be pressed down and then return, the bicycle moves along forwardly.

Other objects and characteristics of this invention will become apparent from the following detailed description of a preferred embodiment of the invention, when read with reference to the accompanying drawings.

DETAILED DESCRIPTION OF THE INVENTION

Figure 1:
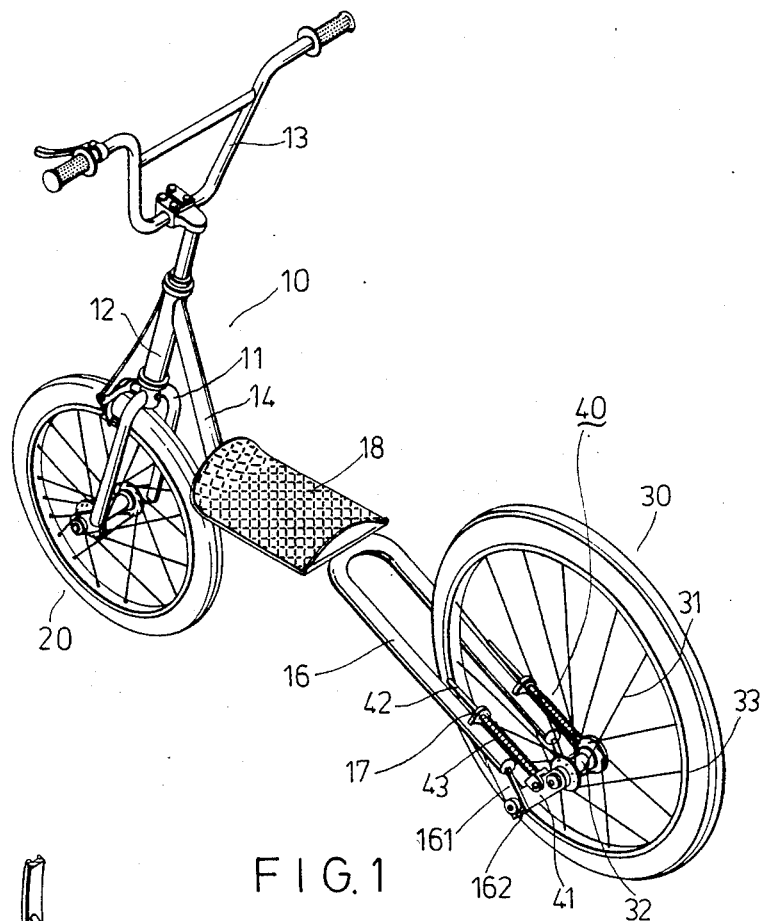
FIG. 1 is a perspective view of a resilient bicycle embodying this invention.

Referring to FIG. 1, a preferred embodiment of a resilient bicycle according to this invention comprises in combination a frame structure 10, a tread board 18, a rear fork member 16, a front wheel 20, a rear wheel 30, and a transmission mechanism 40.

The frame structure 10 as shown comprises a front fork member 11 with its lower ends screw-connected to the front wheel 20. A head tube 12 having an integrally formed down strut 14 is movably coupled with the front fork member 11. A handle frame 13, together with a brake system, is fixed on the top portion of the front fork member 11 which extends the through the head tube 12.

Figure 2:
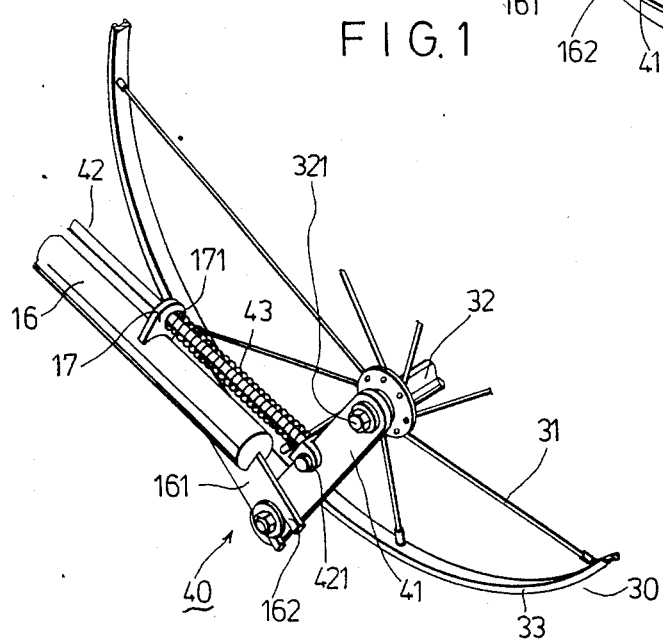
FIG. 2 is a partial perspective view of a transmission mechanism embodied in the resilient bicycle shown in FIG. 1.
Figure 7:
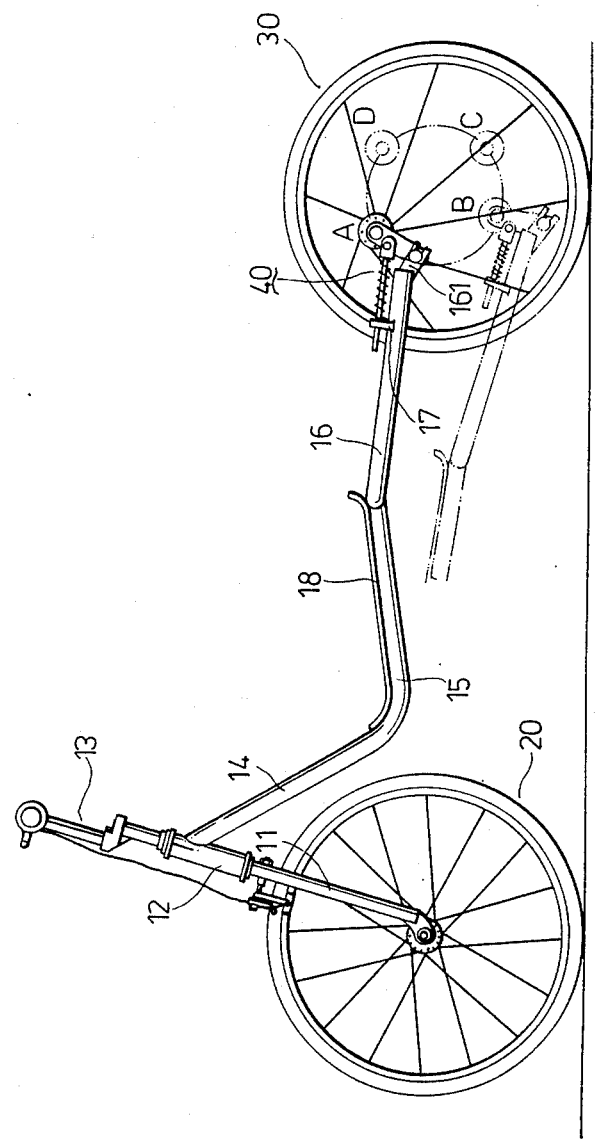
FIG. 7 is an illustrative view showing the continous movement of the resilient bicycle under constant treadling operations.

As shown in FIGS. 1, 2, and 7, the down strut 14 has a level extension stem 15 of which the rearward end is rigidly connected to the curved forward portion of the rear fork member 16. The tread board 18 is firmly fixed to the top of the level extension stem 15 and can be stood upon by the user. The rear fork member 16 is formed in a U-shape with an inclined connecting plate 161 at each rearward end, and a positioning lug 17 at the middle of each leg. Each of the connecting plates 161 has a forked tip 162 at its end. The connection between the level extension stem 15 and the rear fork member 16 is sufficiently resilient for the user to stand on it to cause the vibration as shown in FIG. 7.

The rear wheel 30 is typically combined with a rim 33, a plurality of spokes 31 and a hub fitting 32. The hub fitting 32, with an axle 321 penetrating its opposite sides, is eccentrically arranged in the wheel and anchored by the spokes 31 which are made in different lengths. In a preferred embodiment, the hub fitting 32 is situated at the mid-point of a radius of the wheel 30.

As shown in FIG. 2, the transmission mechanism 40 comprises a pair of transmission plates 41, a pair of guiding rods 42, and a pair of springs 43 (only one of the pair of above-mentioned elements is shown in FIG. 2, since the structure and arrangement of the other member of the pair is identical). One end of each transmission plate 41 is connected to an end of an axle 321 of the hub fitting 32. The other end of transmission plate 41 is movably connected with the forked tip 162 of the rear fork member 16. Each of the guiding rods 42 has a guide lug 421 at its rearward end. Each guide rod 42 is slidingly installed over the rear portion of a rear fork member 16 by inserting its front portion into a guide opening 171 in the positioning lug 17 and through the spring 43 with the guide lug 421 movably connected to the front edge of the transmission plate 41 (the connection on the other side is not shown since the structure is the same). The rear end of each guide rod 42 can be turned and slided along the edge of the transmission plate 41. It shall be appreciated that the springs 43 must have an elastic strength sufficient to control the turning track of the transmission plates 41 and to apply a buffer effect thereat. Furthermore, there must be a clearance between the rear wheel 30 and the curved portion of the rear fork member 16 sufficient to facilitate the driving operation done through the rear fork member 16.

Figure 3:
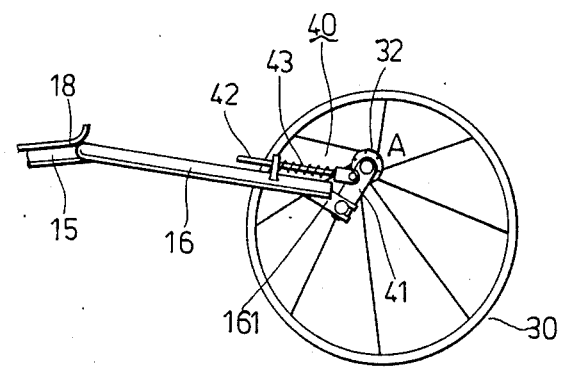
FIGS. 3, 4, 5, and 6 are views showing the locations of a hub system in the rear wheel as it is driven by the transmission mechanism during the vibrating exercise.
Figure 4:
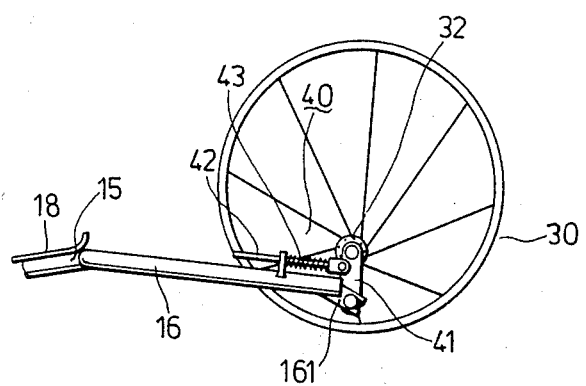
Figure 5:
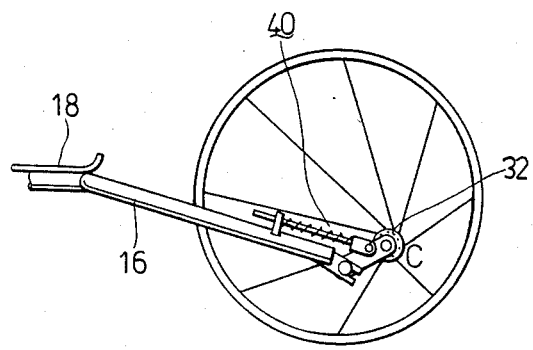
Figure 6:
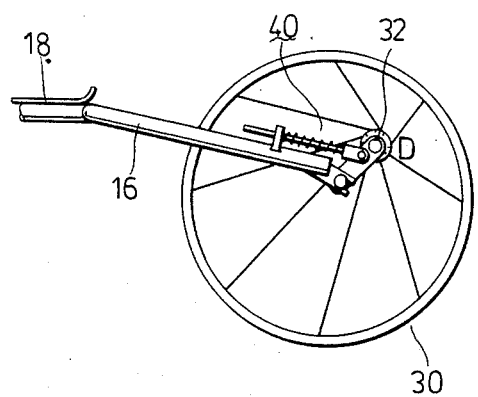

Referring to FIGS. 3, 4, 5, 6, and 7, the operation of the resilient bicycle according to this invention is as follows:

As shown in FIG. 3, when the tread board 18 is not stepped on by the user, the hub fitting 32 is located at point A, with the tread board 18 at its highest position and the springs 43 in their released state. However, when the user stands on the tread board 18 which moves downwardly because of the weight of his body, a turning movement will be produced couterclockwise of the rear wheel 30 through the downward movement of the rear fork member 16 and the transmission plates 41. The rear wheel 30 is therefore moved forward with the hub fitting 32 moving toward point B as shown in FIG. 4. In the meantime, the springs 47 are compressed through the forward movement of the guiding rods 42. When the tread board 18, together with the level extension stem 15 and the curved position of the rear fork member 16, are pressed down to their lowest position, the rear wheel 30 will be kept moving forward owing to the kinetic energy stored in the springs 43. Since a resistance as well as an expansion force is applied by the compressed spring 43, a buffer effect is produced, causing the ends of the inclined plates 161 of the rear fork member 16 at both sides of the rear wheel 30 and the front edges of the transmission plate 41 to be in disengaged condition, enabling the rear wheel 30 to continue its forward movement. By the upward rebound of the tread board 18 through the user's vibrating action, the rear fork member 16, together with the level extension stem 15, will be recovered to the original position through the expansion force of the springs 42, and the transmission plates 41 will be impelled to move upwardly causing the rear wheel 30 to continue its forward rotation with the hub fitting 32 moving from point B to point D through point C as shown in FIGS. 5 and 6. When the tread board 18 is pressed down again by the user, the transmission plates 41 will again be pushed down by the rear fork member 16 and the guide rods 42 and the rear wheel 30 then keeps on moving. The process is repeated as described and illustrated herinbefore. Therefore, as long as the tread board 18 is constantly treadled by the user with his feet and the weight of his body, the movement of the resilient bicycle will continue in one direction as shown in FIG. 7. Of course, the faster the tread board 18 is treadled by the user, the quicker the resilient bicycle will move forward, and vice versa. As for direction control and brake action, the same procedure is to be performed by the user as traditional bicycles require, through the handle frame 13 and the brake system of the resilient bicycle.

While a preferred embodiment has been chosen and illustrated, it will be understood by those skilled in the art that many changes and modifications can be made therein without departing from the scope of this invention as set forth in the following claims.

What I claim is:

1. A resilient bicycle comprises having:

a front wheel;

a rear wheel;

a frame structure; having a front fork member screw-connected to the front wheel, a head tube having a down strut integrally attached thereto movably coupled with the front fork member, and a handle having a brake system arranged thereto fixed on the top portion of the front fork member;

a level extension stem extending rearwardly from a lower portion of the down strut for treadling operation;

a tread board firmly fixed on a top surface of said level extension stem for being stood upon by a user performing the treadling operation;

a hub fitting having an axle provided therein eccentrically disposed in the rear wheel through a plurality of spokes of different lengths for facilitating driving operation therewith;

a generally U-shaped rear fork member having a pair of legs and a curved connecting portion and comprising an inclined connecting plate extending from a rearward end of each leg and a positioning lug having an opening therethrough located at a middle portion of each leg, wherein the curved connecting portion is rigidly connected to the rearward end of said level extension stem;

a pair of transmission plates each connected at one end to a separate end of the axle of said hub fitting and movably coupled at the other end with an inclined connecting plate of said rear fork member;

a pair of guiding rods having guide lugs at their rearward ends which are movably connected to a front edge of one of said transmission plates, wherein the guiding rods extend forwardly over the legs of said rear fork member and slidably pass through the openings of the positioning lugs, wherein the guiding rods slide forwardly and rearwardly through the openings as the result of up-and-down movement of said rear fork member;

a pair of elastic elements, one of said elastic elements being mounted on each guiding rod between the corresponding positioning lug and the corresponding transmission plate so as to bias the transmission plate in a rearward direction when the guiding rods are moved in a forward direction; and whereby, when said tread board is treadled by the user through the weight of his body, said resilient bicycle will be continuously moved forward.

* * * * *

UNITED STATES PATENT AND TRADEMARK OFFICE
CERTIFICATE OF CORRECTION

PATENT NO. : 4,669,746

DATED : June 2, 1987

INVENTOR(S) : Jia-Shyang Wu

It is certified that error appears in the above-identified patent and that said Letters Patent is hereby corrected as shown below:

Column 1, line 21, change "desireable" to -- desirable --.
Column 1, line 21, change "recieve" to -- receive --.
Column 1, line 24, change "cost" to -- costs --.
Column 1, line 32, change "Is" (first occurrence) to -- It --.
Column 2, line 3, change "continous" to -- continuous --.
Column 2, line 20, after "extends" and before "through" delete "the"
Column 3, line 10, change "couterclockwise" to -- counterclockwise --.
Column 3, line 23, change "spring" to -- springs --.
Column 3, line 41, change "herinbefore" to -- hereinbefore --.
Column 4, line 4, change "comprises having:" to --comprising:--

Signed and Sealed this

Twenty-second Day of December, 1987

Attest:

DONALD J. QUIGG

Attesting Officer     Commissioner of Patents and Trademarks